United States Patent [19]

Turpen

[11] Patent Number: 5,112,490
[45] Date of Patent: May 12, 1992

[54] SAMPLE FILTRATION, SEPARATION AND DISPENSING DEVICE

[76] Inventor: Jon Turpen, 230 Jumping Brook Dr., Toms River, N.J. 08753

[21] Appl. No.: 637,644

[22] Filed: Jan. 4, 1991

Related U.S. Application Data

[60] Division of Ser. No. 193,348, May 12, 1988, Pat. No. 5,000,922, which is a continuation-in-part of Ser. No. 831,253, Feb. 19, 1986, abandoned.

[51] Int. Cl.⁵ .................. B01D 61/18; B01D 69/06
[52] U.S. Cl. ................... 210/645; 210/650; 210/749; 210/767; 210/782; 436/178
[58] Field of Search ............... 422/100, 101, 102, 104, 422/58, 59; 436/177, 178; 210/247, 335, 339, 450, 644, 645, 650, 651, 749, 767, 782, 787; 222/1

[56] References Cited

U.S. PATENT DOCUMENTS

| | | | |
|---|---|---|---|
| 589,648 | 9/1897 | Ferdig | 210/359 |
| 4,144,165 | 3/1979 | Matz | 210/644 |
| 4,294,594 | 10/1981 | Sloane, Jr. et al. | 210/446 |
| 4,426,295 | 1/1984 | Evans et al. | 210/772 |
| 4,600,507 | 7/1986 | Shimizu et al. | 210/321.84 |
| 4,632,901 | 12/1986 | Valkirs et al. | 422/58 |
| 4,696,797 | 9/1987 | Kelton | 210/321.6 |
| 5,000,922 | 3/1991 | Turpen | 422/101 |

*Primary Examiner*—W. Gary Jones
*Attorney, Agent, or Firm*—John N. Bain; Raymond J. Lillie

[57] ABSTRACT

An apparatus for dispensing a predetermined amount of a sample into a fluid. The apparatus comprises a chamber which may be inserted into a cuvette. The chamber comprises a means such as a membrane or filter ball for dispensing a predeterming amount of a sample into a fluid upon contact of said membrane or filter ball and said sample by said fluid. The fluid is brought into contact with the sample by vortexing the fluid with a vortex mixer.

2 Claims, 4 Drawing Sheets

SAMPLE FILTRATION, SEPARATION AND DISPENSING DEVICE

This is a division of application Ser. No. 193,348, filed May 12, 1988, now U.S. Pat. No. 5,000,922 which is a continuation in part of application Ser. No. 831,253, filed Feb. 19, 1986, now abandoned.

This invention relates to a sample holder for holding and filtering a sample, (e.g., whole blood) prior to testing with various reagents. More particularly, this invention relates to an apparatus for dispensing predetermined amounts of sample into a diagnostic chemical reagent for preforming a diagnostic test.

In the field of diagnostic clinical chemistry testing, a whole blood sample is collected as a venipuncture and allowed to clot in a blood collection device for 30 to 60 minutes. The blood collection device may contain protein coagulants such as trichloroacetic acid or tungstic acid. After the specimen has clotted, the blood collection tube is centrifuged for 15 to 20 minutes, whereby the clotted blood is separated into blood cells and blood plasma. A specific amount of the plasma is then dispensed into a diagnostic chemical reagent. After a predetermined time period, the specimen is then inserted into a filter photometer or spectrophotometer in order to determine the results.

This method of testing, however, is time consuming and does not allow for the rapid performance of diagnostic chemistry testing. In addition, the technician performing the test must maintain meticulous care in handling the blood specimen so as not to rupture the blood cells, which would result in hemolysis and cause inaccurate test results.

It therefore is an object of the present invention to provide a self-contained and easy to use device which may serve as a combination blood cell separator and plasma dispenser which dispenses a predetermined amount of plasma into a reagent. It is also an object of the present invention to use this device in conjunction with a standard reagent cuvette, and to use the device and cuvette in conjunction with commercially available filter photometers and spectrophotometers.

It is also an object of the present invention to use the device for simultaneous separation of plasma from blood cells and/or particulate matter and dispensing of the plasma into a reagent through the use of a vortex mixer, whereby the reagent is brought into contact with the plasma, and the plasma is dispensed into the reagent.

Another object of the invention is to separate cells and/or particles from a fluid, and to dispense a predetermined amount of the filtered fluid into another fluid.

Applicant's invention is directed to an apparatus comprising a chamber for holding a sample. The chamber includes an entrance opening and an exit opening. The chamber also comprises a first membrane disposed within said chamber for particulate and/or cell filtration from said sample and a second membrane disposed below said first membrane and above said exit opening. The second membrane is capable of metering a predetermined amount of sample out of the exit opening into a fluid upon contact of said second membrane by said fluid.

The apparatus may also comprise means for exposing a predetermined area of a surface of the second membrane to contact with the fluid. This means may be a metering plate disposed beneath the second membrane. A cap means may be disposed above the entrance opening. The apparatus may further comprise a third membrane disposed between the first membrane and the second membrane.

In a preferred embodiment, the second membrane is impregnated with at least one reagent capable of reacting with said sample and said fluid. In another preferred embodiment the second membrane may be impregnated with a first reagent and the third membrane may be impregnated with a second reagent. The first and second reagents are capable of reacting with the sample and with the fluid.

The apparatus may further comprise a cuvette which comprises a top portion and a bottom portion. The cuvette is capable of containing said fluid in the bottom portion of the cuvette. The cuvette is capable of receiving the chamber. The chamber has at least one clip means extending outwardly from the top of the chamber and capable of engaging the top portion of the cuvette, whereby the chamber is fixedly suspended within the cuvette above the fluid upon engagement of the top portion of the cuvette with said at least one clip means. The apparatus may further comprise a seal means within the cuvette. The seal means is disposed above the fluid, and is capable of being broken by the chamber upon insertion of the chamber into the cuvette. The apparatus may also include cutting means attached to the chamber and located beneath the second membrane of the chamber. The cutting means is capable of breaking the seal means upon insertion of the chamber into the cuvette. The cutting means includes at least one opening to accommodate the passage of said fluid through the cutting means to the second membrane.

Instead of a first membrane for particulate and/or cell filtration and a second membrane for metering a predetermined amount of sample into the fluid, the chamber may include a filter means for particulate and/or cell filtration from the sample. The filter means is also capable of metering a predetermined amount of sample out of the exit opening of the chamber into the fluid upon contact of the filter means by the fluid.

Applicant's invention is also directed to a method of dispensing a predetermined amount of sample from a membrane into a fluid. The method comprises exposing a predetermined area of a surface of the membrane containing said sample to contact with the fluid, and vortexing the fluid to a predetermined velocity for a predetermined time whereby the fluid contacts the surface of the membrane and the sample contained on the surface of the membrane. In this manner, a predetermined amount of the sample is dispensed from the membrane into the fluid. The sample may comprise blood plasma. The fluid may be a primary reagent capable of reacting with the blood plasma or any other sample which may be used. The sample may further comprise a secondary reagent capable of reacting with said blood plasma and with said primary reagent. In addition, the sample may also include a tertiary reagent capable of reacting with said blood plasma, said primary reagent, and said secondary reagent.

The invention will now be described with respect to the drawings, wherein.

Figure 1:
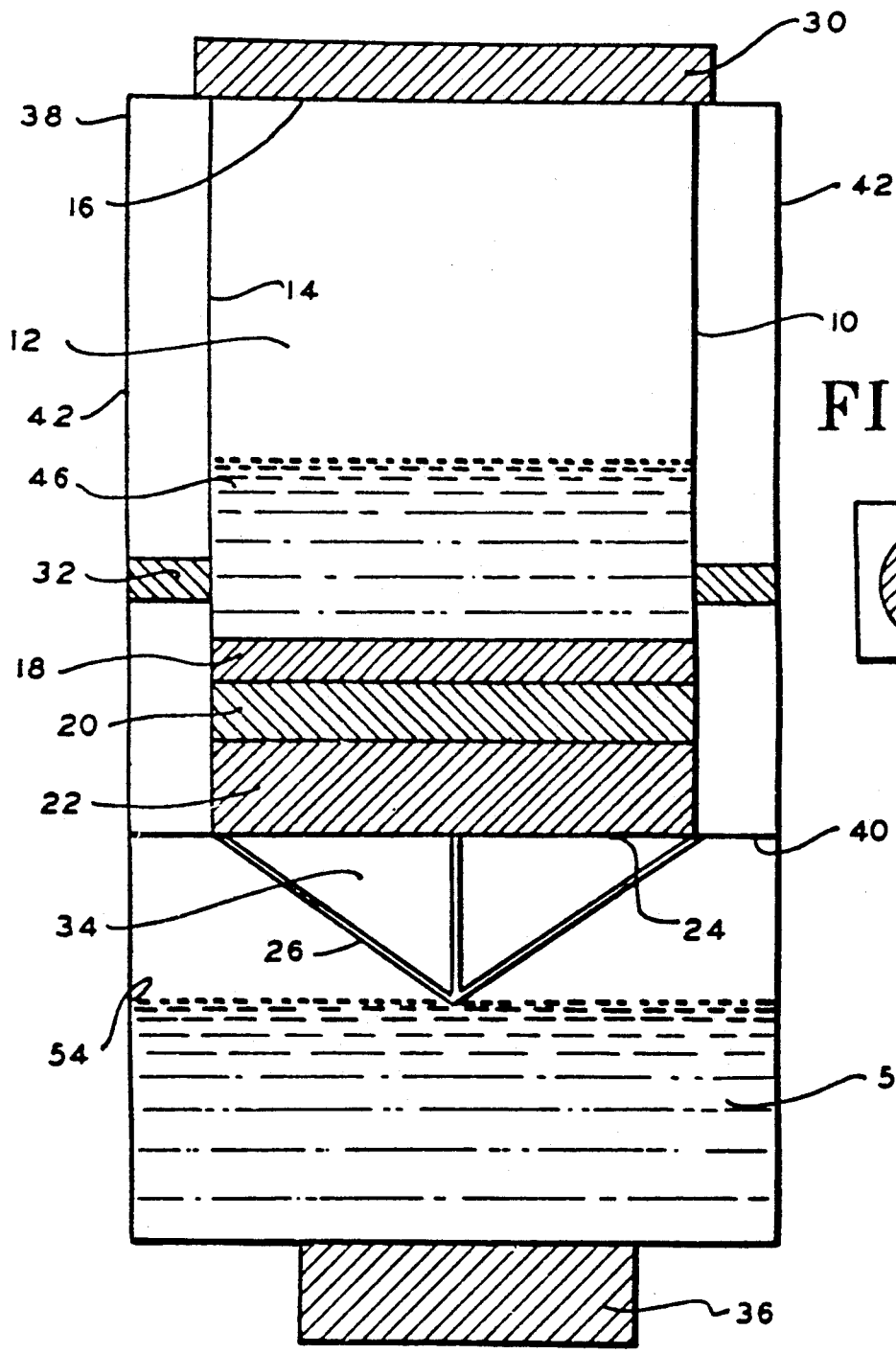
FIG. 1 is a cross-sectional view of an embodiment of the chamber disposed within a cuvette in accordance with an embodiment of the present invention.
Figure 1A:
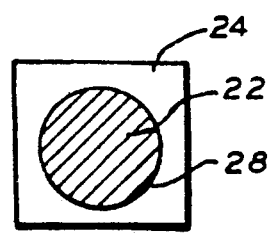
FIG. 1A is a bottom view of the metering plate and second membrane shown in FIG. 1.
Figure 2:
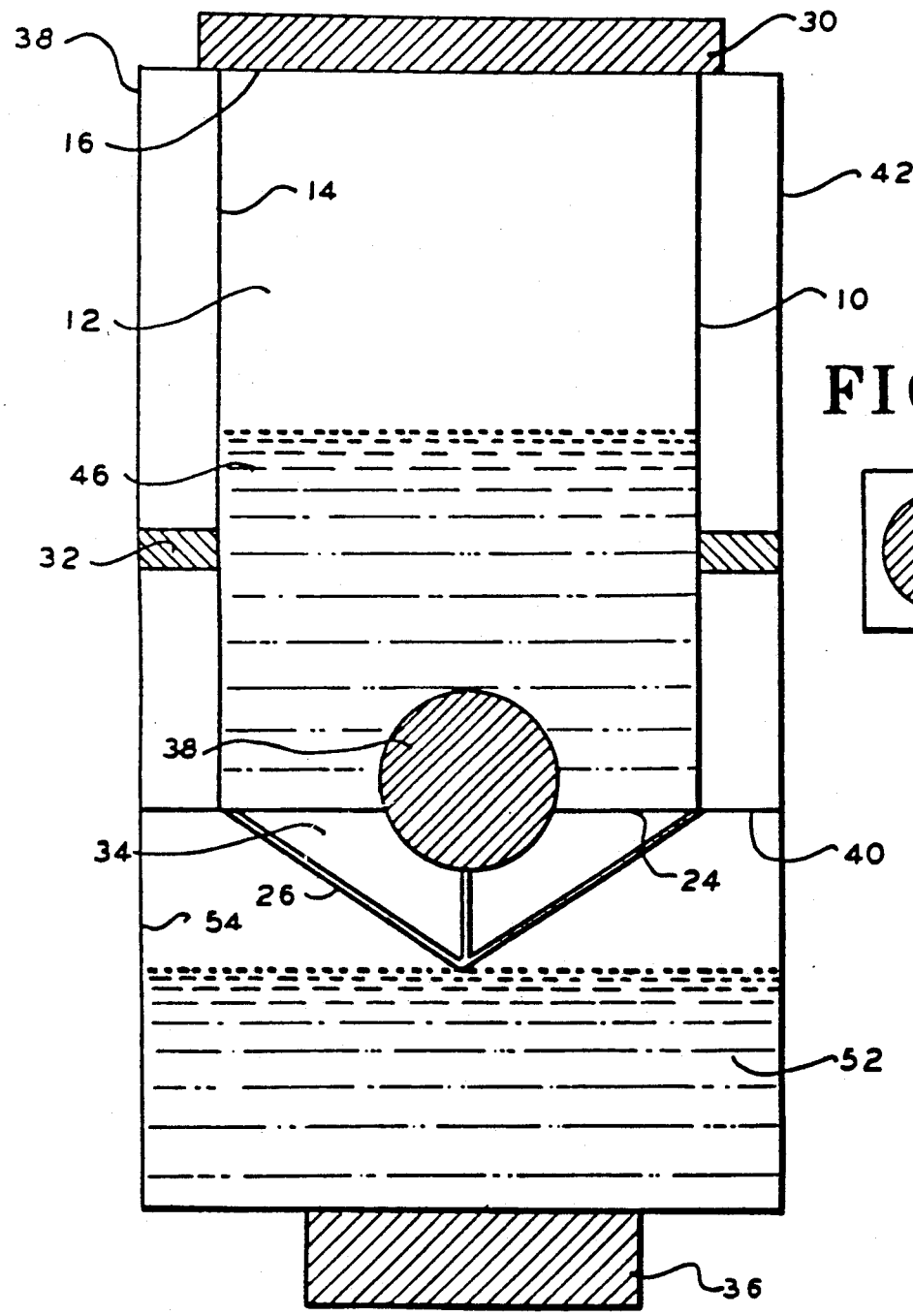
FIG. 2 is a cross-sectional view of another embodiment of a chamber disposed within a cuvette in accordance with the present invention.
Figure 2A:
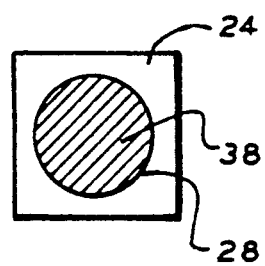
FIG. 2A is a bottom view of the metering plate and ball filter shown in FIG. 2.
Figure 3:
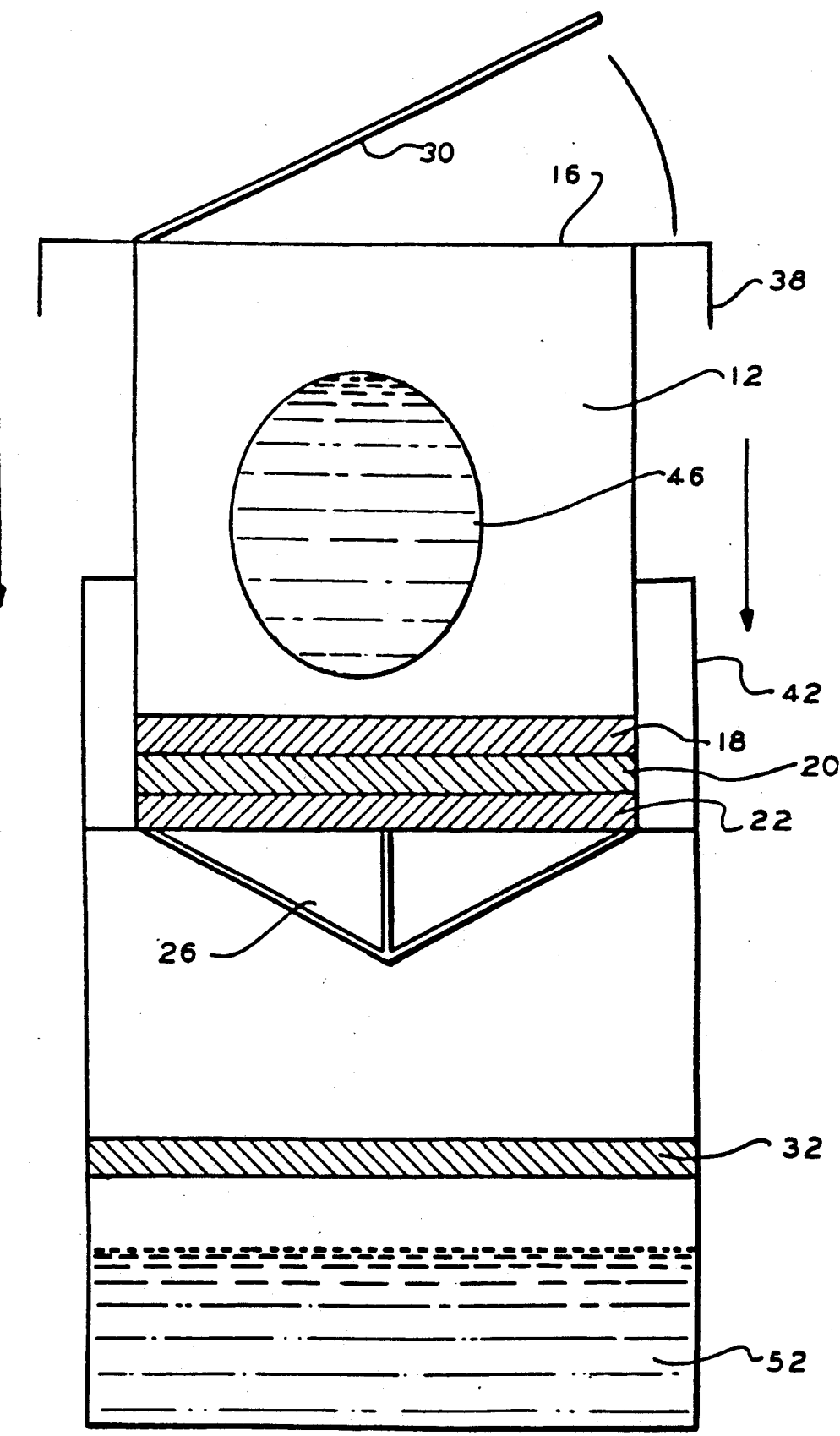
FIG. 3 is a cross-sectional view of how one places a chamber of the present invention into a cuvette.

Referring now to the drawings, the apparatus includes a chamber 10 having an entrance opening 16, a cavity 12 beneath entrance opening 16, and an exit opening 28. The chamber 10 is bounded by a wall 14, which may be of a cylindrical shape. Disposed above entrance opening 16 is a cap 30. Extending outwardly from entrance opening 16 and the top of wall 14 is at least one clip means 38. Clip means 38 is capable of engaging the top portion of cuvette 42.

Disposed within chamber 10 in one embodiment are primary membrane 18, and secondary membrane 22. Optionally, tertiary membrane 20 may be disposed between primary membrane 18 and secondary membrane 22. Secondary membrane 22 is disposed above metering plate 24 which has an exit opening 28. Metering plate 24 is located at the bottom of chamber 10. Located beneath metering plate 24 is a cutting means which may be in the form of a nose piece 26. Nose piece 26 has an opening 34 which permit the passage of fluids to and from secondary membrane 22.

Primary membrane 18 has the function of separating particles and/or cells from a sample such as whole blood sample 46. After passage of sample 46 through primary membrane 18, the sample 46, which now in the preferred embodiment is blood plasma, contacts either secondary membrane 22 or tertiary membrane 20. Secondary membrane 22 may be impregnated, coated, or layered with a secondary reagent capable of reacting with the sample. Tertiary membrane 20 may be impregnated, coated, or layered with a tertiary reagent capable of reacting with sample 46. The number of reagents and membranes disposed beneath the primary membrane 18 depends upon the type of clinical chemistry test one wishes to employ. The secondary and/or tertiary reagents and usually unstable dehydrated reagents which are rehydrated upon contact with sample 46. These reagents, in addition to being capable of reacting with sample 46, also may be capable of reacting with a fluid or primary reagent 52 which contacts secondary membrane 22. The primary reagent 52 thus serves as a leaching reagent which leaches the sample and reagents from the secondary membrane 22 into the fluid or primary reagent 52.

As an alternative to the use of a primary membrane 18, and a secondary membrane 22 and/or a tertiary membrane 20, one may use a combination filter and membrane in the form of filter ball 38. The filter ball 38 serves both as a means to filter particles and/or cells from sample 46, and to dispense a particle-free or cell-free fluid out of exit opening 28. Filter ball 38 may be coated or impregnated with one or more reagents which are capable of reacting with the sample and/or with a fluid or a primary reagent 52 which contacts filter ball 38 in order to leach the sample and/or reagents from filter ball 38 into the fluid or primary reagent 52.

Chamber 10 is adapted to fit within cuvette 42. In a preferred embodiment, cuvette 42 is a 1.0 cm$^2$, 4.0 ml plastic cuvette. Cuvette 42 may contain a fluid, which may be a primary reagent 52 in the bottom portion of cuvette 42. Cuvette 42 is bounded by a wall 54. Disposed within cuvette 42 is a seal means 32 which is located above primary reagent 52. Seal means 32 is capable of being broken by chamber 10 upon insertion of chamber 10 into cuvette 42. Seal means 32 thus serves to prevent spilling or leaking of primary reagent 52 from cuvette 42 before cuvette 42 is utilized in a clinical test.

In order to conduct a clinical test, one places a sample 46 into chamber 10 by lifting cap 30 of chamber 10 and depositing sample 46 through entrance opening 16 and into cavity 12 of chamber 10. One then inserts chamber 10 into cuvette 42. As chamber 10 is inserted into cuvette 42, seal 32 is broken by nose piece 26. As the chamber 10 is lowered further, clip means 38 engages the top of cuvette 42 and serves to lock chamber 10 in place within cuvette 42. Chamber 10 is fixedly suspended within cuvette 42 so that secondary membrane 22 and metering plate 24 are suspended above primary reagent 52. Once the chamber 10 is fixedly suspended in the cuvette 42, the sample is allowed to pass through primary membrane 18, whereby cells and/or particles are separated from sample 46, and then into secondary membrane 22. Before passing into secondary membrane 22, the sample 46 may pass into tertiary membrane 20 and may also contact a tertiary reagent which coats or has been impregnated into tertiary membrane 20. The tertiary reagent may be a dehydrated reagent which becomes rehydrated when contacted by sample 46. Whether a tertiary membrane and/or tertiary reagent is used depends on the type of clinical test employed. In addition, if necessary, more than one membrane may be disposed between primary membrane 18 and secondary membrane 22.

In a preferred embodiment, sample 46 is a speciment of whole blood. In this embodiment, blood cells and/or particles are filtered out of sample 46 by primary membrane 18, and blood plasma passes into and through tertiary membrane 20 and/or secondary membrane 22.

After passing through primary membrane 18 and/or tertiary membrane 20, the filtered sample 46 is absorbed by secondary membrane 22. Secondary membrane 22 may or may be coated or impregnated with a secondary reagent which is capable of reacting with sample 46. The secondary reagent may be a dehydrated reagent which is rehydrated upon contact by sample 46.

The sample 46 is absorbed by secondary membrane 22 for a specific time period. The length of this time period depends on the type of clinical test and the sample employed. When blood plasma is absorbed by secondary membrane 22, a preferred absorption time is about 10 minutes. The predetermined absorption time period allows sufficient time for adequate absorption of the sample 46 into secondary membrane 22 and for sample 46 to contact the reagent, or reagents, which may be coating or be impregnated within secondary membrane 22.

As an alternative embodiment, sample 46 may contact filter ball 38 instead of primary membrane 18, secondary membrane 22, and/or tertiary membrane 20. In this embodiment, filter ball 38, combines the functions of primary membrane 18, secondary membrane 22, and/or tertiary membrane 20 in that primary membrane serves to separate cells and/or particles from sample 46 and also may be coated or impregnated with one or more reagents. Sample 46 is allowed to be absorbed into filter ball 38 for a predetermined period of time. When filter ball 38 is employed, filter ball 38 absorbs a specific volume of sample 46 which is proportioned to the diameter of filter ball 38.

Once the sample 46 has been absorbed for the desired time period into secondary membrane 22 or filter ball 38, it is ready to be dispensed in a predetermined amount into primary reagent 52. The amount of sample 46 to be dispensed into primary reagent 52 depends on various factors. Sample 46 is dispensed into primary reagent 52 from secondary membrane 22 or filter ball 38 through contact of secondary membrane 22 or filter ball 38 by primary reagent 52. This contact is caused by a vortexing of primary reagent 52. A vortex mixer 36 is activated. Vortex mixer 36 mechanically oscillates cuvette 42 and causes a whirlpool effect of primary reagent 52 in the bottom of cuvette 42. Vortex mixer 36 may be any type of vortex mixer which is known in the art. The strength of the whirlpool of the primary reagent 52 is increased as the rpm of the vortex mixer 36 is first increased and then maintained at a constant predetermined level. The vortex mixer is also set at a predetermined rpm for a predetermined amount of time. The result is that a predetermined velocity of the vortexed primary reagent is also maintained.

The vortexed primary reagent 52 then rises in cuvette 42 up to nose piece 26. Primary reagent 52 passes upwardly through opening 34 in nose piece 26 and gradually contacts metering plate 24, passes upwardly through exit opening 28 in metering plate 24, and contacts a surface of secondary membrane 22 or filter ball 38. The amount of area of secondary membrane 22 or filter ball contacted therefore depends on the diameter of exit opening 28 of metering plate 24.

When the primary reagent contacts secondary membrane 22 or filter ball 38, a leaching of the sample 46, and/or of any reagents which may have reacted with the sample 46, into primary reagent 52 occurs. Thus, it can be seen that the amount of sample 46 which is dispensed into primary reagent 52 is dependent upon the diameter of exit opening 28 of metering plate 24, the velocity of the vortexed primary reagent 52, and the time the primary reagent 52 is vortexed. The velocity of the vortexed primary reagent 52 is dependent upon the mechanical oscillation or rpm of the vortex mixer 36. When a filter ball 38 is used, the amount of sample 46 dispensed into primary reagent 52 may also be dependent upon the diameter of filter ball 38.

As shown in the drawings, ear tabs 40 extend inwardly from wall 54 of cuvette 42 to the outer edge of metering plate 24. The ear tabs 40 prevent the vortexed primary reagent 52 from rising above metering plate 24 during vortexing of the primary reagent 52.

Figures 4, 4A:
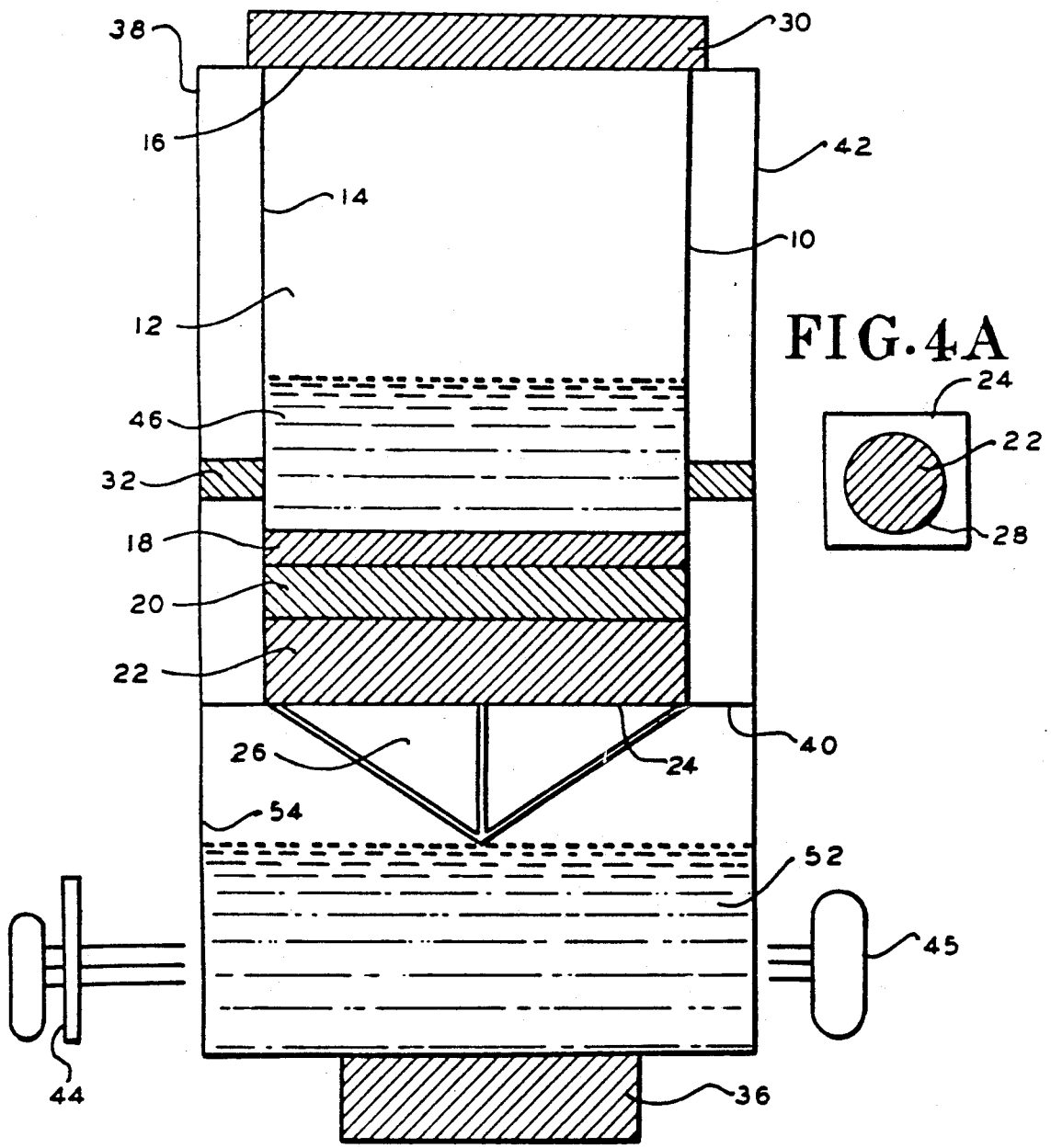
FIG. 4 is a cross-sectional view of how a fluid contained within a cuvette in accordance with the present invention is subjected to photometric analysis.
FIG. 4A is a bottom view of the metering plate and second membrane shown in FIG. 4.

After the vortexing of primary reagent 52 is stopped, the primary reagent 52 and any sample 46 and/or reagent or reagents leached out of secondary membrane 22 or filter ball 38 by primary reagent 52 settle to the bottom of cuvette 42. Sample 46 and/or any reagents may react with primary reagent 52. In a preferred embodiment, cuvette 42 is made of a clear acrylic plastic. This enables the cuvette 42 to be used in conjunction with a photometer or spectrophotometer. As shown in FIG. 4, cuvette 42 containing primary reagent 52, sample 46, and/or other reagents in the bottom of cuvette 42, is placed between a light emitter 44 and an absorbance measuring device 45. Light emitter 44 directs light of a specific wavelength through cuvette 42 and primary reagent 52, which contains sample 46 and possibly other reagents. Absorbance of the light by the primary reagent 52 and sample 46 is measured by absorbance measuring device 45. The absorbance can then be converted to a meaningful test result.

Various clinical tests may be performed by using the chamber and cuvette of the present invention. One example is a hexokinase glucose test. In this test, the coenzyme NAD would serve as the secondary reagent impregnated or coated on secondary membrane 22 or a filter ball 38. NAD would be a color reagent. The reaction of the NAD color reagent would be as follows:

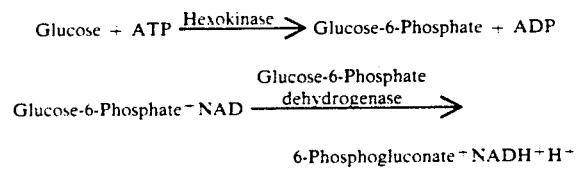

Glucose is phosphorylated with adenosine triphosphate (ATP) in the reaction catalyzed by hexokinase. The product, glucose-6-phosphate, is then oxidized with the concomitant reduction of nicotinamide adenine dinucleotide (NAD) to NADH in the reaction catalyzed by glucose-6-phosphate-dehydrogenase. The formation of NADH causes an increase in absorbance at 340 nm. The increase is directly proportional to the amount of glucose in the specimen.

The concentration of NAD on the secondary membrane 22 or filter ball 38 would be approximately 1.0 mM. The contents of the primary reagent 52 which would be vortexed so as to contact a blood plasma sample mixed with the NAD secondary reagent, would be as follows:

Hexokinase: 1,000 units/liter
ATP: 1.0 mM
Nonreactive stabilizers and filters
Glucose-6-Phosphate Dehydrogenase—1,000 units/liter
Phosphate Buffer—100 mM pH7.5±0.1

The NAD would be rehydrated with the plasma specimen and be dispensed simultaneously with the plasma specimen when the primary reagent 52 is vortexed by the vortex mixer 36. Thus, it is apparent that the chamber 10 and cuvette 42 of the present invention can be used for known clinical chemistry tests such as glucose tests, which are of great use in detecting Type I or Type II diabetes, hypoglycemia, hyperglycemia, or the onset of insulin reactions or diabetic coma in diabetics.

The following Example will demonstrate an embodiment of a glucose test performed by using an embodiment of the sample holder and cuvette of the present invention.

EXAMPLE

250 μl of reagent grade water is dispensed into a sample holder in accordance with the present invention. This sample holder is contained within a cuvette in accordance with the present invention. A cap is located over the top of the sample holder and cuvette, which can be opened in order to deposit a sample, and closed after the sample is added. The cuvette contains a primary reagent. The sample holder contains either a combination of a primary membrane and a secondary membrane, with an optional tertiary membrane between the primary and secondary membranes, or a filter ball. Any of the membranes or the filter ball may be impregnated with a reagent. A metering plate having an opening is at the bottom of the sample holder. The metering plate is located below the membranes or filter ball. The sample holder and cuvette containing the reagent grade water is labeled as Blank.

250 μl of glucose calibrator is dispensed into a second sample holder contained within a cuvette as described above. The glucose calibrator is a solution containing a predetermined concentration of glucose (e.g., 150 mg/dl). This sample holder and cuvette containing the glucose calibrator is labeled as Calibrator.

250 μl of a patient's whole blood specimen is then dispensed into a third sample holder contained within a cuvette as described above. This sample holder and cuvette is labeled as Patient Whole Blood.

All cuvettes and sample holders are then placed into an incubator at 30° C. for 10 minutes. After the incubation the cuvettes containing the sample holders are placed in a vortex mixer, which is turned on for 5 seconds at 1,000 rpm. The vortex mixing enables a predetermined amount of each sample to be dispensed from the secondary membrane or filter ball into the primary reagent through contact of the secondary membrane or filter ball by the primary reagent. The primary reagent may be of the composition hereinabove described, although the scope of the invention is not to be limited thereby. After the vortexing is completed the cuvettes and sample holders are again incubated at 30° C. for 5 minutes. During this time, a chemical reaction has been initiated for measuring the concentration of glucose in the calibrator in the whole blood specimen.

After the incubation period is completed, the Blank cuvette is inserted into a photometer. The photometer is zeroed (i.e., absorbance is set at 0) for the Blank cuvette at 340 nm.

The calibrator cuvette is then inserted into the photometer and its absorbance is measured at 340 nm. The concentration factor is then calculated for this lot of primary reagent. For example, if the concentration of glucose in the calibrator is 150 mg/dl, and the absorbance at 340 nm is 0.500, the concentration factor then is 150/0.500, or 300.

The Patient Whole Blood cuvette is then inserted into the photometer and its absorbance is measured at 340 nm. The absorbance is multiplied by the concentration factor to determine the concentration of glucose in the patient's blood. For example, if the absorbance for the sample is 0.750 and the concentration factor is 300, the concentration of glucose in the specimen is 0.750 × 300, or 225 mg/dl. Thus, it is apparent that the sample holders and cuvettes of the present invention are useful in various aspects of diagnostic testing. For this example, it is shown that the sample holders and cuvettes of the present invention can be used in the diagnosis of or testing for diabetes mellitus, or can be used to monitor blood sugar control in diabetic patients.

It is to be understood, however, that the scope of the present invention is not be limited to the specific embodiments described above. For example, the amount of membranes and reagents employed may vary and still be within the scope of the invention. The invention may be practiced other than as particularly described and still be within the scope of the accompanying claims.

What is claimed is:

1. A method of dispensing a predetermined amount of a sample comprising blood plasma and at least one reagent from a membrane into a fluid, wherein said at least one reagent is capable of reacting with said blood plasma and said fluid, said method comprising:
   exposing a predetermined area of a surface of said membrane containing said sample to contact with said fluid; and
   vortexing said fluid to a predetermined velocity for a predetermined time, whereby said fluid contacts said membrane and said sample contained on said surface of said membrane, whereby a predetermined amount of said sample is dispensed from said membrane into said fluid.

2. The method of claim 1 wherein said fluid is a primary reagent capable of reacting with said blood plasma.

* * * * *